(12) United States Patent
McHugh et al.

(10) Patent No.: US 7,716,641 B2
(45) Date of Patent: May 11, 2010

(54) METHOD AND SYSTEM FOR AUTOMATICALLY IDENTIFYING AND MARKING SUBSETS OF LOCALIZABLE RESOURCES

(75) Inventors: Barry McHugh, Dublin (IE); Jan-Roelof Falkena, Seattle, WA (US); Robert Grimes, Dublin (IE); Terry Farrell, Mount Merrion (IE); David Ahs, Dublin (IE); Alexei Soloveitchik, Dublin (IE)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 11/042,806

(22) Filed: Jan. 24, 2005

(65) Prior Publication Data

US 2006/0130026 A1    Jun. 15, 2006

Related U.S. Application Data

(63) Continuation-in-part of application No. 11/002,773, filed on Dec. 1, 2004, now Pat. No. 7,617,092.

(51) Int. Cl.
G06F 9/44 (2006.01)
(52) U.S. Cl. ........................... 717/124; 717/141
(58) Field of Classification Search ................ 717/124, 717/141
See application file for complete search history.

(56) References Cited

U.S. PATENT DOCUMENTS

| | | | |
|---|---|---|---|
| 4,649,480 A | 3/1987 | Ohki et al. | |
| 5,450,538 A | 9/1995 | Glaser et al. | |
| 5,664,206 A | 9/1997 | Murow et al. | |
| 5,671,378 A | 9/1997 | Acker et al. | |
| 5,872,973 A | 2/1999 | Mitchell et al. | |

(Continued)

FOREIGN PATENT DOCUMENTS

EP    1049328 A1 *  2/2000

OTHER PUBLICATIONS

"Detours: Binary Interception of Win32 Functions," by Glaen Hunt & Doug Brubacher, Proceedings of the 3rd USENIX Windows NT Symposium, Seattle, Washington, Jul. 1999, pp. 1-9.

(Continued)

Primary Examiner—Wei Y Zhen
Assistant Examiner—Junchun Wu
(74) Attorney, Agent, or Firm—Merchant & Gould P.C.

(57) ABSTRACT

Embodiments of the present invention relate to methods, systems and computer-readable media for identifying a safe set of resources that can be used for localization of a software product. This identification involves loading and running a base product having one or more calls to an operating system (or an API) to load language specific data. The resource calls are intercepted after the resource is loaded into a resource loader, and information about the resource is captured for analysis. The display of resources is also intercepted to gather data on which resources are displayed and the context of this display. The process involves running automated tests and/or manual tests on the base product in its base language to identify those resources that are most frequently used, least often or never used, and those that are unsafe. These resources so identified are then analyzed to generate a safe secure resource list that can then be used for external localization of the software product.

9 Claims, 4 Drawing Sheets

U.S. PATENT DOCUMENTS

| | | | |
|---|---|---|---|
| 5,886,694 | A | 3/1999 | Breinberg et al. |
| 6,025,836 | A | 2/2000 | McBride |
| 6,035,121 | A * | 3/2000 | Chiu et al. ............... 717/141 |
| 6,041,180 | A | 3/2000 | Perks et al. |
| 6,093,215 | A | 7/2000 | Buxton et al. |
| 6,195,794 | B1 | 2/2001 | Buxton |
| 6,275,790 | B1 | 8/2001 | Yamamoto et al. |
| 6,275,978 | B1 | 8/2001 | Bell |
| 6,339,755 | B1 | 1/2002 | Hetherington et al. |
| 6,392,673 | B1 | 5/2002 | Andrew et al. |
| 6,467,085 | B2 | 10/2002 | Larsson |
| 6,469,713 | B2 | 10/2002 | Hetherington et al. |
| 6,496,793 | B1 | 12/2002 | Veditz et al. ............... 704/8 |
| 6,513,025 | B1 | 1/2003 | Rosen |
| 6,530,039 | B1 | 3/2003 | Yang |
| 6,557,165 | B1 | 4/2003 | Nagashima et al. |
| 6,658,644 | B1 | 12/2003 | Bishop et al. |
| 6,662,355 | B1 | 12/2003 | Caswell et al. |
| 6,691,298 | B1 | 2/2004 | Russo et al. |
| 6,718,549 | B1 | 4/2004 | Narin et al. |
| 6,744,450 | B1 | 6/2004 | Zimniewicz et al. |
| 6,766,348 | B1 | 7/2004 | Combs et al. |
| 6,820,267 | B2 | 11/2004 | Christensen et al. |
| 6,859,820 | B1 | 2/2005 | Hauduc et al. |
| 6,877,154 | B2 | 4/2005 | Nagashima et al. |
| 6,931,628 | B2 | 8/2005 | McGeorge, Jr. |
| 6,950,993 | B2 | 9/2005 | Breinberg |
| 6,968,438 | B1 | 11/2005 | Russo et al. |
| 7,017,143 | B1 | 3/2006 | Andrew et al. |
| 7,111,282 | B2 | 9/2006 | Stephenson |
| 7,152,222 | B2 | 12/2006 | Kumhyr et al. |
| 7,222,343 | B2 | 5/2007 | Heyrman et al. |
| 7,228,541 | B2 | 6/2007 | Gupton et al. |
| 7,234,110 | B2 * | 6/2007 | Sumitomo ............... 715/234 |
| 7,318,020 | B1 | 1/2008 | Kim |
| 7,337,079 | B2 | 2/2008 | Park et al. |
| 7,437,704 | B2 | 10/2008 | Dahne-Steuber et al. |
| 2003/0025737 | A1 | 2/2003 | Breinberg |
| 2003/0101043 | A1 | 5/2003 | Boegelund et al. |
| 2003/0126559 | A1 * | 7/2003 | Fuhrmann ............... 717/137 |
| 2004/0122652 | A1 | 6/2004 | Andrews et al. ............... 704/2 |
| 2004/0167784 | A1 | 8/2004 | Travieso et al. ......... 704/270.1 |
| 2004/0230416 | A1 | 11/2004 | Ye et al. |
| 2004/0268311 | A1 * | 12/2004 | Pizzoli et al. ............... 717/124 |
| 2005/0050526 | A1 * | 3/2005 | Dahne-Steuber et al. .... 717/136 |
| 2005/0066315 | A1 | 3/2005 | Nguyen et al. |
| 2005/0102253 | A1 | 5/2005 | Wu et al. |
| 2005/0188383 | A1 | 8/2005 | Alcazar et al. |
| 2006/0059424 | A1 | 3/2006 | Petri et al. |
| 2006/0080082 | A1 | 4/2006 | Ravindra et al. |
| 2006/0116864 | A1 | 6/2006 | McHugh et al. |
| 2006/0130031 | A1 | 6/2006 | McHugh et al. |
| 2006/0130032 | A1 | 6/2006 | McHugh et al. |
| 2006/0150173 | A1 | 7/2006 | McHugh et al. |
| 2006/0206797 | A1 | 9/2006 | Kohlmeier et al. |
| 2007/0150258 | A1 | 6/2007 | Lister et al. |
| 2007/0226687 | A1 | 9/2007 | Fallen-Bailey et al. |

OTHER PUBLICATIONS

"Vectored Exception Handling in Windows Server 2003," http://www.devx.com/SummitDays/Article/15992/1411/pdo/B9440BEA0C53FEBCB807C22A051841D.

Annotated Bibliography of Internationalization and Localization, J.D. Becker, Scientific American, Jul. 1984, pp. 96-107.

Forte Programming Guide, Release 3, 1998, Chapter 15.

Forte Software, Building International Applications, 1995, Whole Manual.

Internationalization and Localization Using Microsoft.NET, Nick Symmonds, Jan. 2002, Chapters 2-3, 7, 9-11.

Kenneth Keniston "Software Localization: Notes on Technology and Culture" Jan. 17, 1997.

Office Action, Aug. 22, 2007, Issued in U.S. Appl. No. 11/040,331.
Office Action, Nov. 28, 2007, Issued in U.S. Appl. No. 11/040,330.
Office Action, Feb. 5, 2008, Issued in U.S. Appl. No. 11/040,331.
Office Action, Feb. 21, 2008, Issued in U.S. Appl. No. 11/042,470.
Office Action, Mar. 18, 2008, Issued in U.S. Appl. No. 11/002,773.
Office Action, Jun. 5, 2008, Issued in U.S. Appl. No. 11/040,330.
Office Action, Sep. 24, 2008, Issued in U.S. Appl. No. 11/042,470.
Office Action, Oct. 27, 2008, Issued in U.S. Appl. No. 11/040,331.
Final Office Action, Oct. 30, 2008, Issued in U.S. Appl. No. 11/002,773.
Office Action, Mar. 30, 2009, Issued in U.S. Appl. No. 11/042,470.
Office Action, Jun. 9, 2009, Issued in U.S. Appl. No. 11/042,470.

* cited by examiner

METHOD AND SYSTEM FOR AUTOMATICALLY IDENTIFYING AND MARKING SUBSETS OF LOCALIZABLE RESOURCES

CROSS REFERENCE TO RELATED APPLICATIONS

This application is a continuation-in-part of U.S. patent application Ser. No. 11/002,773, filed Dec. 1, 2004, which is hereby incorporated by reference herein in its entirety.

TECHNICAL FIELD

The invention relates generally to the field of computer software products. More particularly, the invention relates to methods and systems for producing language specific versions of a software product.

BACKGROUND OF THE INVENTION

Software products of all types, whether operating systems or various types of application programs, are frequently provided in multiple "localized", language specific versions. For instance, a software product may initially be developed in a specific language such as English. Once this original, or "base" product has been developed and tested, localized versions, in a language appropriate to the market for which the product is intended, may be developed. For example, a product originally developed in English in the United States may be localized to produce a Japanese language version for sale in Japan. The process of creating a localized version, or translation, is herein referred to as "localization."

A common method of localization is known as internal localization. Internal localization typically involves changing the resources of the original software product to produce the localized version. For example, all of the elements of the user interface, messages, help information, and other language specific parts of the software product are translated and rebuilt. Since the resources of the software product are revised and rebuilt, testing is required for each internally localized version generated, in addition to the base product. The building of the dynamic link libraries (DLLs) correctly is a complex process for many applications, and the tools involved are often proprietary or secret. Since testing is labor intensive, this method can be extremely expensive. In addition to being expensive, internal localization, due to the long time required to test a software product, results in a very slow delivery of localized versions of software products. This is known as the multiple language user interface (MUI) approach where all of the resources for each language are grouped into resource files. These files are usually stored in a folder named after the language. It is with respect to these needs that the present invention has been developed.

SUMMARY OF THE INVENTION

An embodiment of the present invention is a system and method for building a secure resource list for use in a translation, or localization, of a software product that, after the application is loaded in its base language, transparently examines each call for a resource to be loaded from a multiple language user interface dynamic linked library (MUI DLL), checks whether the particular called resource is in a secure resource list, and, if it is in the secure resource list, loads that resource from an alternative location (without the knowledge of the application). If the resource is not in the secure resource list, then the resource simply is not loaded.

A method of using runtime data to build a resource list for use in localization of a software product in accordance with an embodiment of the present invention includes operations of 1) performing one or more automated tests or manual tests on an application running on an operating system, intercepting resources as they are loaded into a resource loader by one of running application or operating system, and capturing information on the resources as the resources are loaded by the application or operating system during the tests. This information is then analyzed to determine, among other things, frequently used resources and which resources are not loaded frequently or not at all. The resource list that forms the secure resource list is then generated by including the most frequently used resources and excluding the resources never loaded. In accordance with other aspects, the present invention relates to a system for building a secure resource list for localization, i.e. translation, of a software product that has a processor and a memory coupled with and readable by the processor. The memory contains a series of instructions that, when executed by the processor, cause the processor to: run an application on an operating system and perform one or more tests on the application. The instructions then cause the processor to intercept and capture information on loaded resources as the resources are called by the application or operating system during the tests, analyze the information to identify resources used and resources displayed, and generate a resource list from including the identified used resources and displayed resources.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
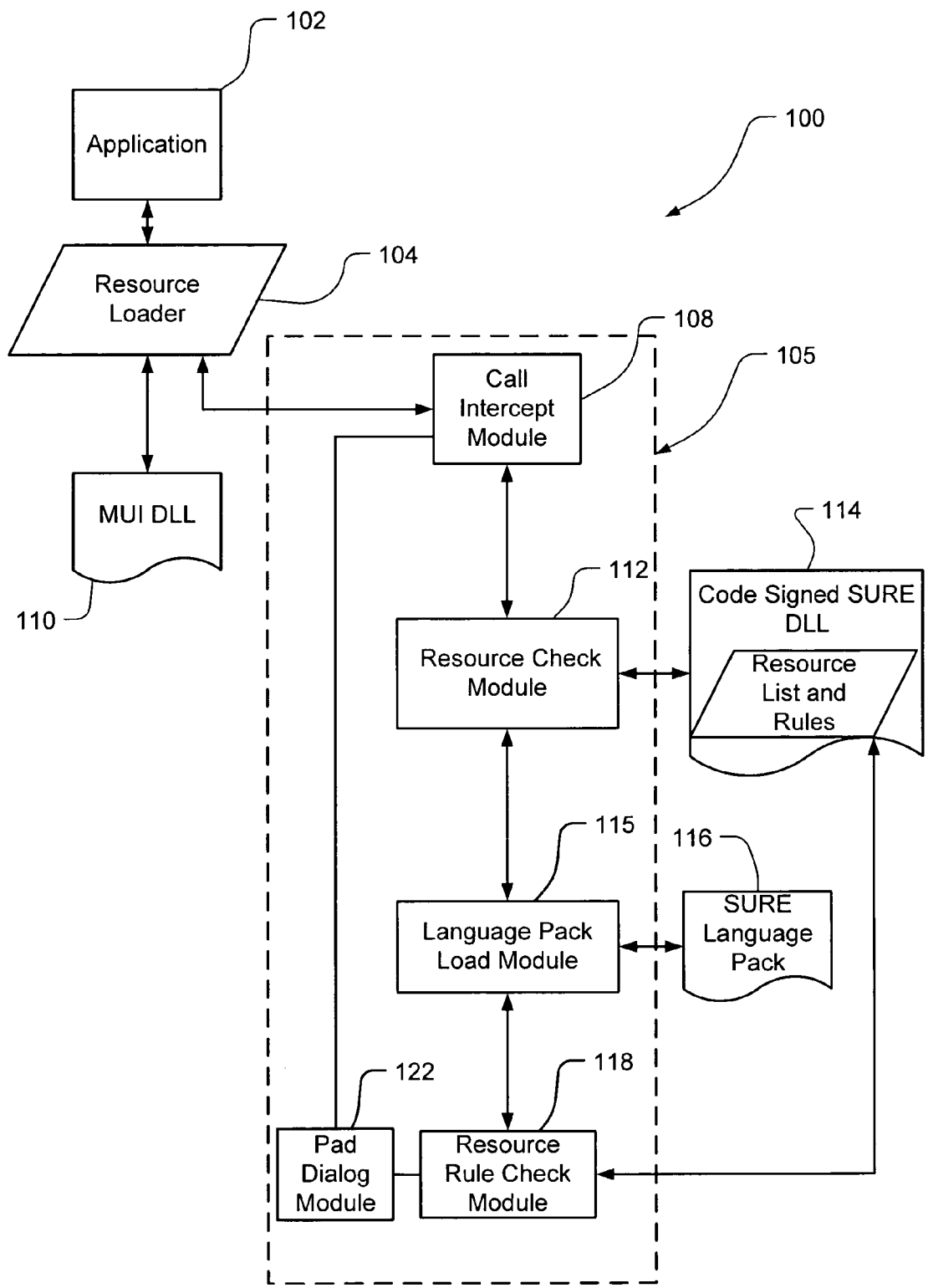
FIG. 1 illustrates, conceptually, a safe, secure localization environment according to one embodiment of the present invention.

FIG. 1 illustrates, conceptually, a secure resource (hereinafter SURE) localization system 100 according to one embodiment of the present invention. In an application such as a Microsoft® Windows operating system or Office® application, when the application 102 is loaded into the computer operating system, a call is made to a resource loader module 104. It is to be understood throughout this detailed description that the application 102 is exemplary only. The call may be made by an application, data including various data structures, Application Program Interface (API) or operating system. The resource loader module 104 checks to see what language is called for by the application 102 and goes to the appropriate language folder. From this language folder, the loader 104 retrieves the called resource preferably from a multiple language user interface dynamic link library (MUI DLL) 110. The resource called is then loaded and transferred to the operating system. The notion of storing the resources in a MUI DLL 110 is also only exemplary. The resources can be stored in any format range from files to databases (or even remote locations such as locations accessible via the internet).

However, in embodiments of the present invention, an interception of the resource is made in the resource loader 104 before transfer to the calling application.

The system 100 utilizes a SURE localization module 105 that draws from a secure code signed DLL 114 and a user developed SURE language pack 116 described in further detail below. The localization module 105 includes a call intercept module 108, a resource check module 112, a language pack load module 115, a resource rule check module 118, and a dialog pad module 122.

Intercept module 108, in embodiments of the present invention, intercepts the resource after the resource is loaded by the resource loader module 104 from the MUI DLL 110. Any of a number of known methods may be used to intercept the resource loading functions (or API's). A number of intercept methods are well known. Examples include overwriting the start of the function itself in memory, known as installing a detour, or detouring. Another exemplary method overwrites the import address table. Further examples of interception methods are described in an overview article on patching by Yariv Kaplan. One preferred method of detouring is one in which binary functions are intercepted by rewriting one or more target function images. Detouring replaces the first few instructions of the target function with an unconditional jump to a user-provided detour function and preserves the target function instructions in a trampoline function. The detour function can either replace the target function or extend its semantics by invoking the target function as a subroutine through the trampoline. The detour is preferably inserted at execution time such that the procedures in a DLL can be detoured in one execution of an application, while the original procedures are not detoured in another execution running at the same time.

Once an intercepted call is received, the call intercept module 108 communicates with the resource check 112. This module queries whether the resource transferred from the MUI DLL 110 into the resource loader module 104 has an identifier that matches one of the identifiers in code signed SURE dynamic link libraries or databases (SURE DLL's) 114. The identifiers in the code signed DLL 114 signify those resources that the application developer gives permission for a user to translate, i.e. for which authorization is given for translations to be generated. This is done by checking the resource identifier against a list inside the code signed SURE DLL 114. The code signed DLL (or database) 114 cannot be modified by a user. The code signing itself also prevents anyone from adding additional resources to the files in this library. The SURE DLL 114 contains a list of the resource identifiers for all of the resources that are authorized to be translated. For each one of these it also has a list of verification rules. This file is the same for any SURE language.

It is to be understood that throughout this specification the code signed DLL 114 is simply one type of secure data structure that can be used. Any database, file, file set, or DLL can perform this function so long as it cannot be modified in any way by an unauthorized user. Authorization is preferably limited to the originator/developer of the calling application or operating system itself. In this way, the code signed DLL 114 is predetermined and not modifiable by a third party user. If the resource has a matching resource identifier, a translation of the resource, i.e. a localized resource or translation is loaded from a SURE language pack library or glossary file 116. The Language Pack library file 116 can be anything from an XML file through to a database. Translations could come from internet services or from machine translation tools rather than physical files.

Language packs 116 contain the language specific translations and differ from one language to the next. Typically these files are created by human translators (i.e., people who will provide a list of translations for their language). A fast lookup format development or SURE build tool could also be optionally provided to speed up runtime performance. The SURE Build Tools (which could be part of a SURE Kit) take the editable format of the translations (i.e., XML or text files) and convert them to a format that can be loaded quicker at runtime (e.g., a database)—this database is what is called the Language Pack.

An example of an XML file (that a build tool would take as input) might look as follows:

```
<resNode name="Dialogs">
    <resource id="string1">
        <text>This is the text to translate</text>
        <reftext>This is reference text, such as the translation in
        another language</reftext>
        <rules>These are the verification rules. Examples:
            <maximumlength> 5</maximumlength>
        </rules>
    </resource>
</resNode>
```

Users can translate this in any simple editor (e.g., the "Notepad" accessory application included in Microsoft Windows® operating system). A more advanced editor preferably is also provided (as part of the SURE language pack creation kit) that, for example, would color-code the bits that need to be edited, and check the verification rules as the user edits.

Another kit tool preferably would convert the edited text/xml file to a faster runtime format such as an Access Database or other fast binary format (i.e., the language pack 116.)

One exemplary verification rule is Maximum Length (which could appear in the editable file as "<maximumlength>5</maximumlength>". This rule verifies that the translated resource, or string is not longer than an allowable limit. For example, if the maximum length is 5, the string "Hello" would be passed, but the string "Bonjour" would fail.

Another exemplary verification rule is a required placeholder, i.e. a case where a portion of a string must remain present. For example, a string like "Hello % s" might need to be translated. The translator would be allowed to move the "% s" portion around in the string, because it is replaced by another value at runtime (e.g. by a person's name). However, the verification rule would not allow removal of the "% s" substring. If it were removed (by the user creating a language pack, for example) then the verification would fail.

The format of the language pack databases will most likely be published so that users could write their own tools to create them independently. Note that this will not be the case for the code signed resource list files (i.e., the SURE DLL 114), where every effort is taken to protect the format and content from hacking or reverse engineering by closely controlled access authorization. Thus the code signed dynamic link library 114 is a library that cannot be modified by a user, i.e. anyone other than one authorized by the original owner/developer of the calling application or operating system.

Unlike MUI files, the language pack files do not have to be stored in a folder that is dependant on the target language. For instance, Microsoft's Office® German MUI files are stored in a "1031" folder (which happens to be the LCID or Language Code for German). In contrast, a German SURE language pack could be in "\program files\SURE\German" or "\program files\SURE\1031" or "\mymachine\mylanguages\myGerman". In other words, this can be a location chosen by the user, and the SURE tools can easily be configured to point to any location (local machine, remote server or even internet).

The language pack load module 115 receives instruction from the resource check module 112, that the called resource is matched in the SURE DLL. The language pack load module 115 then retrieves the required language pack 116. The resource string or file is checked for compliance with key restrictions and rules contained in the code signed SURE DLL 114 in the resource rule check module 118 The SURE DLL's contain both the allowable resource identifiers and a list of rules to go with each of these resource identifiers. These restrictions are preferably stored in a format that is quick to parse and validate. Modifications are made to the resource string to ensure that the base (or source) language hotkey remains in the resource. This is because translators cannot adjust hotkeys, as such adjustment would impact functionality of the underlying application and/or operating system.

If the translation loaded in the load module 115 from the language pack 116 complies with all the verification rules in the code signed SURE DLL 114 as determined in the check module 118, the translated dialogs, if any, are padded in the pad dialog module 122 as called for by the resource rules. In module 122, the sizes of controls in dialogs may need to be padded to accommodate long translated strings. If they are not padded the translated text will not fit in the available space and will be truncated or cut. The translated resources are then passed through the resource loader 104 to the calling application 102 or data structure, or, if it were the operating system itself that made the call, to the operating system.

The application 102 represents any of a wide variety of possible software products including but not limited to a word processor, spreadsheet, Internet browser, database, operating system, and others. The base application may be developed in and for a specific language. For example, a product developed in the United States may be developed in English. Alternatively, the base product may be language neutral. That is, the base product may be developed in such a manner as to have no reference in its user interface or other elements written to a specific language. The MUI DLL 110 provides full translations for multiple languages that have been fully tested and provide full functionality to the application. In other cases, the base application may be written with only minimal reference to a specific language to facilitate testing of the base product during development.

Again, the MUI DLL 110 provides the translations for a number of specific languages. In contrast, the user defined language packs and the use of a secure data store such as a code signed SURE DLL 114 permits virtually any language to be utilized in an application and accommodates thousands of languages or dialects that are non-mainstream languages.

The user defined language packs require no interaction with the software developer (original application owner of application 102) to use and thus these language packs can be freely developed and disseminated via the internet and other media, without compromising the functionality of the underlying application 102.

In embodiments of the present invention, because critical resources are not translated, non-translated resources remain in the base language thus ensuring security of the underlying program. The SURE language packs are language neutral. They are just collections of glossary files that have a one to one correspondence with resources that can be translated. There is no enabling function with embodiments in accordance with the present invention. SURE functions purely as a translation layer.

Figure 2:
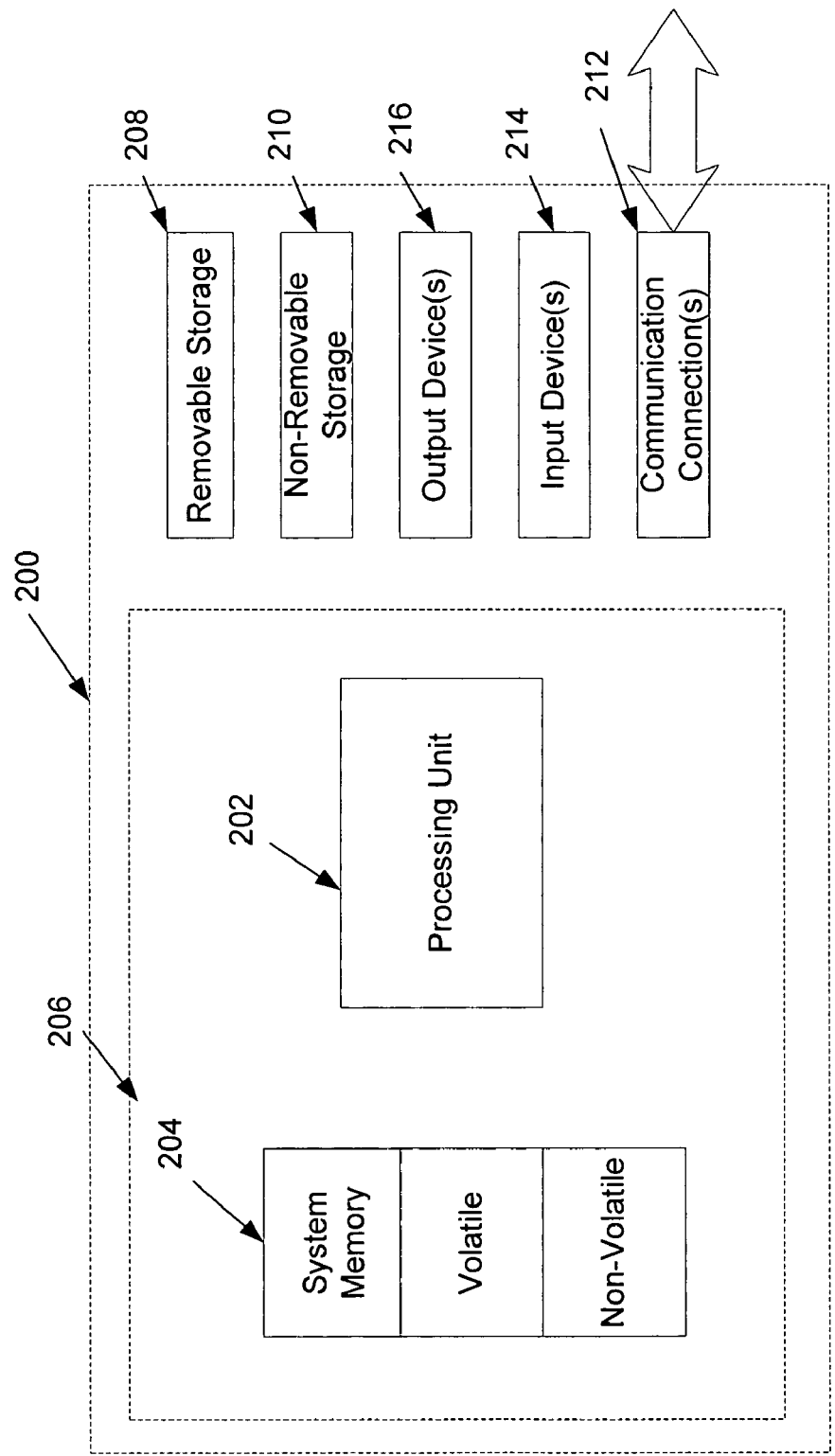
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used as a stand-alone computer or to serve as a redirector and/or servers in a website service. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
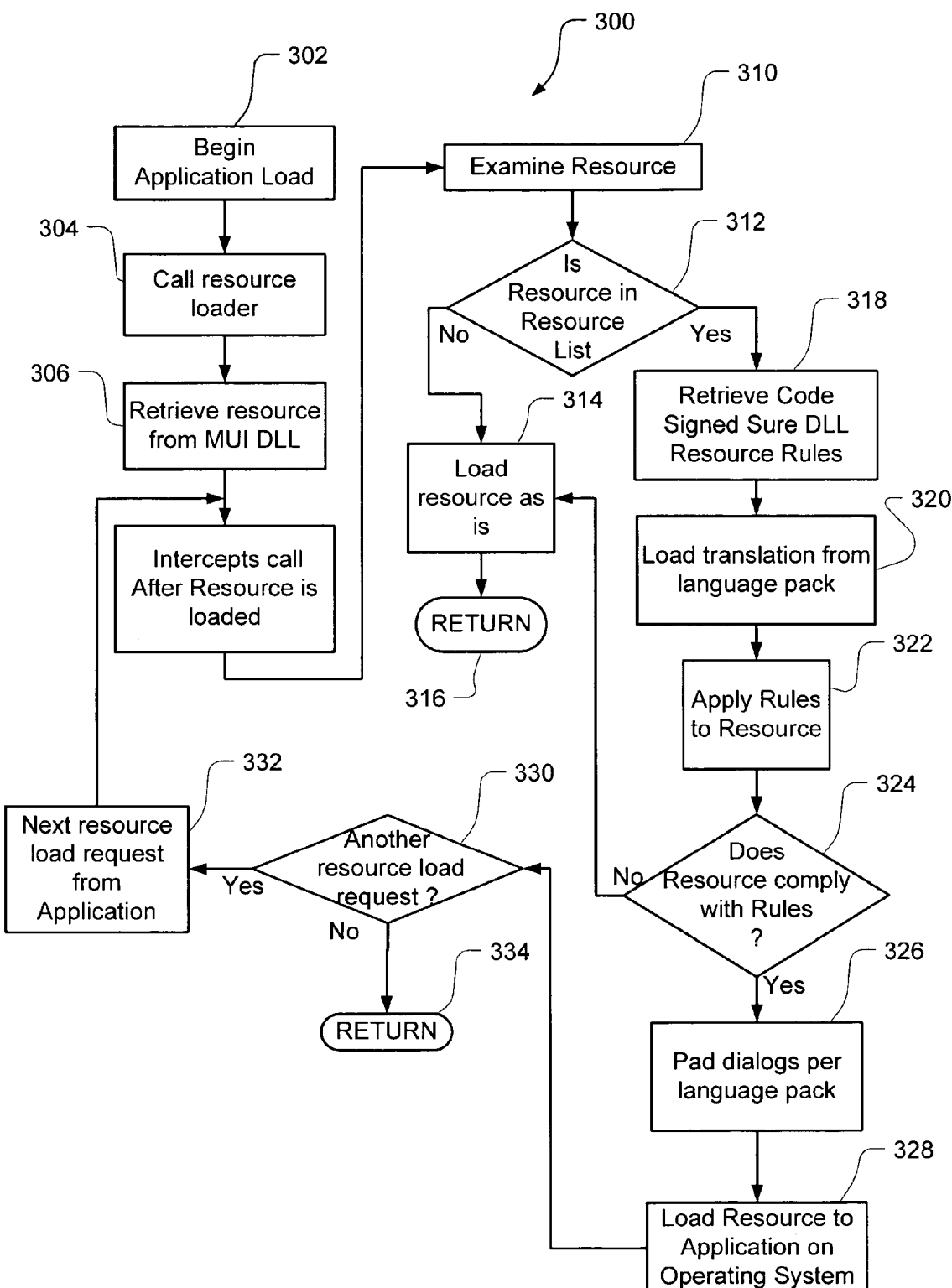
FIG. 3 is a flowchart illustrating load time operations for safe secure localization of a software product.

FIG. 3 is a flowchart illustrating operational flow 300 of the translation system and method according to one embodiment of the present invention. In this example, operation begins with application loading operation 302. In operation 302 the application load is commenced onto the operating system of the computing device 200. During this loading operation a call may be made to the resource loader 104. Control then passes to operation 304 where the application calls the resource loader. The resource loader in turn queries the MUI DLL 110 (i.e., resources). Control then transfers to operation 306.

In operation 306 the MUI DLL 110 is searched until a match is found and the called resource is identified. The called resource is retrieved and sent to the resource loader 104. Control then transfers to operation 308 where the application call is intercepted via the call intercept module 108. Control then transfers to operation 310.

Operation 310 examines the retrieved resource to obtain its identifier(s). Control then passes to query operation 312 in resource check module 112 which determine if it has an identifier that matches one of the identifiers stored in the code signed SURE DLL 114. If there is a match, then control passes to operation 318. If there is no match, then control passes to operation 314. In operation 314, the resource loaded from the MUI DLL 110 is passed to the operating system without modification in any way.

On the other hand, if there is a match, and control passes to operation 318, the code signed SURE DLL 114 is queried to retrieve all resource rules pertaining to the called resource. Control then passes to operation 320. In operation 320, a translation of the called resource is loaded in the load module 115 from the appropriate language pack 116 for the resource. This translation, i.e., the localized resource, is loaded and then compared, in check module 118, to the rules pertaining to that resource in operation 322. The applicable rules found in the SURE DLL 114 are then applied to the resource to verify that the translation complies with all applicable rules. Control then passes to query operation 324.

In query operation 324, the query is made by the check module 118, whether the localized resource complies with the applicable rules. If so, control passes to operation 328. If the resource does not comply with the applicable rules, the resource is not translated, but is passed to operation 314, where the resource is passed through the resource loader 104 to the calling application or operating system without translation. No modifications are made to the original loaded resource if the new translations fail on any of the rules. On the other hand, if the resource complies with all the applicable rules, i.e. verification is successful, then control passes to operation 326, where, in module 122, applicable translated or localized resource dialogs are padded in accordance with instructions provided by the language pack. At this stage modifications may also be made to the hotkeys where necessary. Control then passes to operation 328.

In operation 328, the localized resource has now been translated and therefore is passed or loaded back to the calling application and loaded on the operating system. Control then passes to query operation 330. Query operation 330 asks whether there are any further resource load requests in the resource loader 104. If so, control passes to operation 332 where the next resource load request is received from the calling application into the resource loader 104. If there is no further resource load request from the application or operating system, control returns to the resource loader 104 to await another request, in operation 334.

The SURE solution in accordance with the present invention allows for a subset of application resources to be translated. However the right set of resources needs to be translated to achieve the following:

Good user interface coverage. It's not very desirable to see a partially translated user interface, especially on frequently used features.

To allow for minimal translation. The less there is to translate, the more likely it is that more languages will be translated, since one target of such a solution is translation carried out by voluntary community efforts.

Safety is also very important. Any resources that cannot be safely translated (i.e., without breaking application functionality or introducing security problems) need to be excluded.

Identifying such a sub-set of resources can be a very long laborious effort. The techniques described below speed up and automate the process of identifying a small, safe, subset of resources to translate.

One embodiment of the present invention utilizes data gathered during both automated and manual testing which exercises the key functions, functionality, and user interface of the source language product. This runtime data is logged or captured during runtime as the application is executed. This capturing is done with special tools that involve use of a variety of intercept techniques. For example, preferable techniques that are used to intercept the loading of resources are the same as those discussed above with reference to the interception in the resource loader 104 The interecept techniques are used to intercept display functions in addition to resource load functions. The result is a captured list of loaded resource identifiers, loaded strings, displayed strings and information on where the loaded strings are displayed.

This captured data is analyzed in accordance with the present invention to determine an initial set of resources for the secure resource list. The following kind of information can be garnered by analyzing the runtime data:

a) The set of resources that are loaded by the application. The correlation to this is that it is possible to determine which resources are not loaded by the application and these can be excluded from the secure resource list.

b) The set of resources that are loaded most frequently. This data can be used to prioritize the set of resources to translate.

c) The set of resources that are displayed by the application. The correlation to this is that this can also be used to determine the set of resources that are not displayed by the application, and these can be thus excluded from the secure resource list.

d) The set of resources that are displayed most frequently. Once again this can be used to prioritize the set of resources to translate.

e) The context in which the resources are displayed. An example of this is discovering that a resource is displayed on a button or a menu. Based on how important this kind of element is, the priority of translating the resource can be determined. In addition, this contextual relationship can also be used to determine unsafe resources. For example a resource may appear in a HTML control. For security reasons it could be decided not to allow the translation of these strings given the number of ways that hackers could attempt to use or exploit in HTML controls.

Figure 4:
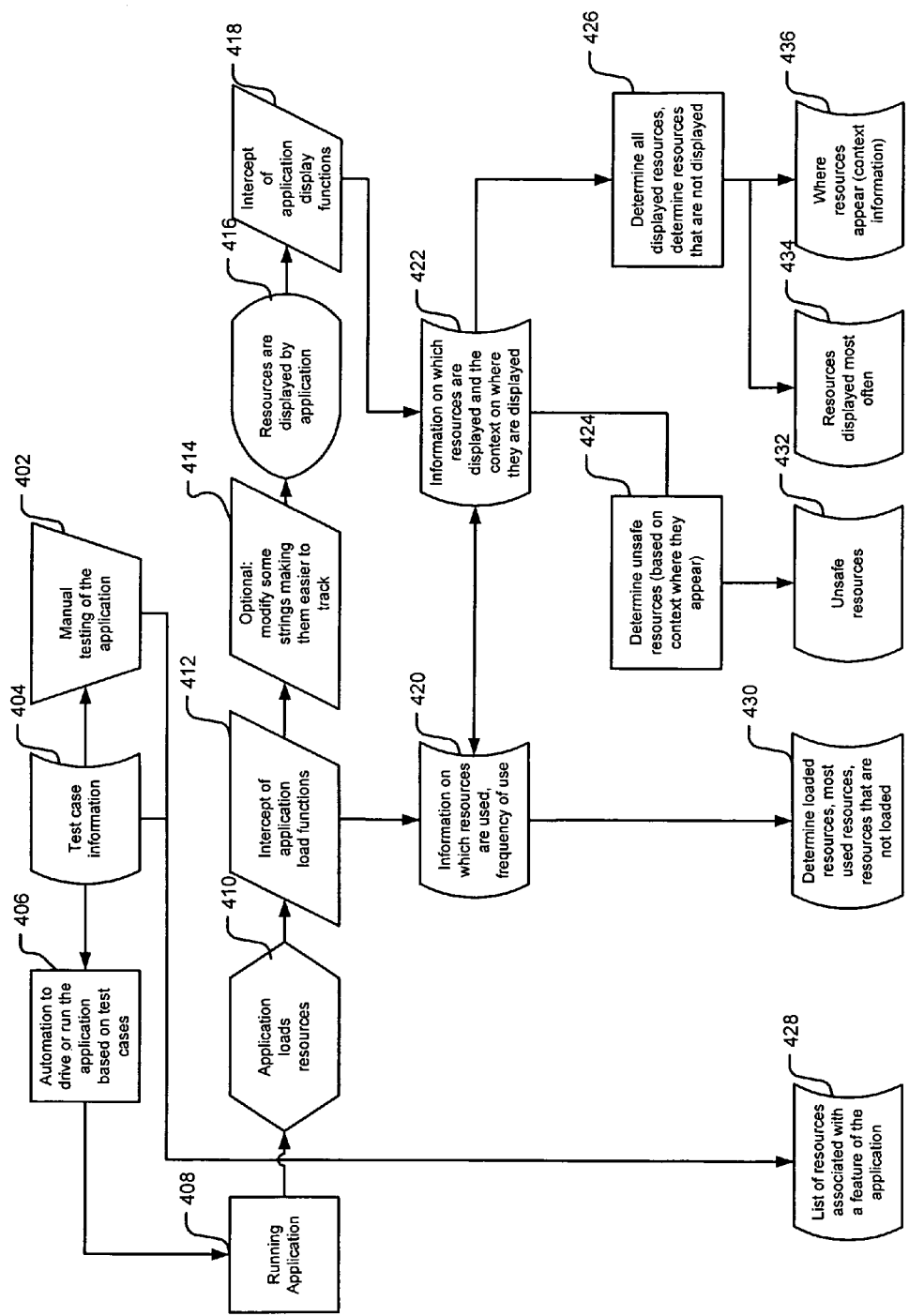
FIG. 4 is a flowchart illustrating build time operations to generate a secure resource list for use with a software product utilizing safe, secure localization according to one embodiment of the present invention.

FIG. 4 provides an exemplary diagram 400 of the process operations to generate a secure resource list of those resources that are generally needed for operation of a software product and are most often utilized in operation of the product. FIG. 4 demonstrates how runtime data is collected for analysis. In general, the operations shown are arranged in five horizontal rows based on the functional categories involved. These categories are: testing, shown in the top row; running application functions, shown in the second row; recording of runtime data, shown in the third row; analysis of runtime data, shown in the fourth row; and finally, generation of the resource list content, shown in the fifth row.

The first part, testing, shown in the top row of operations in FIG. 4, include gathering the information and automation needed to exercise the functionality of the application. This can consist of manual testing activities as shown in operational block 402 and automated testing software in operational block 406. With manual testing somebody uses their knowledge of an application to work their way through the functionality of the application. This person may avail of test case information as shown in block 404. Test cases include information on how to exercise the functionality of an application. This can range from written instructions (e.g., do this, then do that, then click this, etc.) that a user can understand, to data that the automation software 406 can use to drive an application. A set of manual tests, test cases and automated test routines are chosen to exercise the most commonly used features of the application. As these features are exercised, the functions in rows two, three and four are performed in order to come up with the data blocks in row five.

This manual and automated testing is performed on the running application at operational block 408. The application loads resources as needed in operation 410 and displays some of these resources as needed in operation 416. In addition some test case information, in operation 404, may be directly provided to the list of resources to be used in the SURE list that are associated with an application feature in operation 428.

The SURE resource identification process in accordance with an embodiment of the present invention uses intercept technology to intercept the loading of resources at intercept operation 412. This intercepted data feeds into operation 420. Operation 420 logs details of loaded resources that have been intercepted, and the frequency with which they are loaded. Again, the methods to intercept the loading of resources are the same ones used to perform localization that has been discussed previously. The difference is that display functions are intercepted rather than load functions.

The SURE resource identification process in accordance with an embodiment of the present invention also preferably uses this same intercept technology on the functions that display the resources that have been loaded. This occurs in operational block 418. The interception that takes place includes functions both in the application that is running and those in the operating system. This display resource identifier data is in turn logged in operational block 422 along with associated information on the context of the resource display.

The SURE process may also actually modify some resources in operation 414 to make it possible to really track the usage of those particular resources. Take an example of the string "OK" which may exist hundreds of times in the various resources. At the time the application displays this string it may not be possible to know which of the loaded versions of "OK" is actually being displayed. To get around this the SURE determination process may change the string to include the resource identifier—for example to "ID101_OK". Now, when the SURE process intercepts the display of "ID101_OK" it is able to match the load of that resource to its display and figure out in operation 422 which resources are actually displayed.

In operation 430 the data logged in operation 420 is analyzed. From this operation 430 determines which resources are loaded as well as the frequency with which they are loaded. Finally, operation 430 can determine which identified resources are not loaded.

Operation 424 examines some of the data logged by operation 422 to determine whether some resources should not be translated based on how they are used at runtime. An example (already given) is of a string at appears in an HTML control. Such HTML controls are highly susceptible to hackers and therefore may be categorized as unsafe. Any unsafe resources are logged by operation 432.

Information in operation 422 is also supplied to operation 426. Operation 426 examines data logged by operation 422 to determine which resources are displayed and which resources are not displayed. Data gathered from this operation 426 is provided to operation 434, which compiles the list of most frequently displayed resources. Operation 436 in turn gathers from the data in operation 426 where, i.e., the context in which, the resources are displayed. This data can be used to ensure high priority items (e.g., buttons) are included in the resource list.

Operational block 428 is used to associate the data manually gathered in operation 402, or gathered with the test cases or automation (operation 406 or 404). This operation 428 enables the gathering of data based on different feature sets.

The data contained in operations 428, 430, 432 434 and 436 are then consolidated to generate the secure resource list that preferably becomes the code signed resource DLL 114 shown in FIG. 1 and first described above.

Although the invention has been described in language specific to computer structural features, methodological acts and by computer readable media, it is to be understood that the invention defined in the appended claims is not necessarily limited to the specific structures, acts or media described. As an example, other types of data may be included in the language map in place of the string data discussed herein. Additionally, different manners of referencing the language specific data of the language map from the system calls in base product may be used. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodi-

What is claimed is:

1. A method of using runtime data to build a resource list for use in localization of a software product comprising:

performing one or more automated tests or manual tests on an application running on an operating system, the tests exercising functionality and a user interface of the application;

intercepting resources as they are loaded into a resource loader by one of running application or operating system;

capturing information on the resources, including displayed resources, as the resources are loaded by the application or operating system during the tests;

capturing information on contextual display of resources;

analyzing the information to prevent translation of unsafe resources based upon the resources' contextual relationships, to determine most frequently used resources, including the most frequently displayed resources, to ensure that a high priority resource is included in the resource list, and to determine which resources are never loaded and never displayed;

generating the resource list from the most frequently used and displayed resources and excluding the resources never loaded and those resources never displayed; and tracing loaded strings by using string modification, wherein the one or more automated tests or manuals tests are performed prior to generating the resource list.

2. The method according to claim 1 further comprising generating a list of resource identifiers and strings from the analyzing operations.

3. The method according to claim 1 wherein the captured information is obtained by intercepting resources as they are called.

4. The method according to claim 3 wherein the generating includes generating a list or resource identifiers and strings from the analyzing operations.

5. The method according to claim 4 further comprising analyzing the data to determine unsafe resources.

6. A system comprising:

a processor; and a memory coupled with and readable by the processor and containing a series of instructions that, when executed by the processor, cause the processor to:

run an application on an operating system;

perform one or more tests on the application, the tests exercising functionality and a user interface of the application;

intercepting resources as they are loaded into a resource loader by one of running application or operating system;

capture information on loaded resources, including displayed resources, as the resources are called by the application or operating system during the tests;

capture information on contextual display of resources;

analyze the information to prevent translation of unsafe resources based upon the resources' contextual relationships, and to identify resources most frequently used and resources most frequently displayed to ensure that a high priority resource is included in the resource list, and to determine which resources are never loaded and never displayed;

generate a resource list from the most frequently used resources and most frequently displayed resources and excluding the resources never loaded and those resources never displayed; and trace loaded strings by using string modification, wherein the processor performs the one or more tests on the application prior to generating the resource list.

7. The system according to claim 6 wherein the instructions cause the processor to:

capture information on resources that are never displayed; and capture information on resources that are never used.

8. The system according to claim 6 wherein the instructions further cause the processor to generate a list of resource identifiers and strings from the analyzing operations.

9. A computer readable storage medium encoding a computer program of instructions for executing a computer process for determining a resource list for use in localization, said computer process comprising:

running one of an application, data or an operating system wherein one of the application, the data or the operating system places one or more calls to a resource loader to load a resource;

performing one or more automated tests or manual tests on the application, the tests exercising functionality and a user interface of the application;

intercepting the resource in the resource loader after the called resource has been received in the loader;

capturing information on the resource, including displayed resources, during the tests;

analyzing the information to prevent translation of unsafe resources based upon the resources' contextual relationships, to determine the most frequently used resources, including the most frequently displayed resources, to ensure that a high priority resource is included in the resource list, and to determine which resources are not being loaded and those resources that are never displayed;

generating the resource list from including the most frequently used and displayed resources and excluding the resources not loaded and those resources never displayed;

capturing information on contextual display of the resources;

analyzing the information to determine unsafe resources;

generating a list of resource identifiers and strings from the analyzing operations; and tracing loaded strings by using string modification;

wherein the one or more automated tests or manual tests are performed prior to generating the resource list.

* * * * *